UNITED STATES PATENT OFFICE.

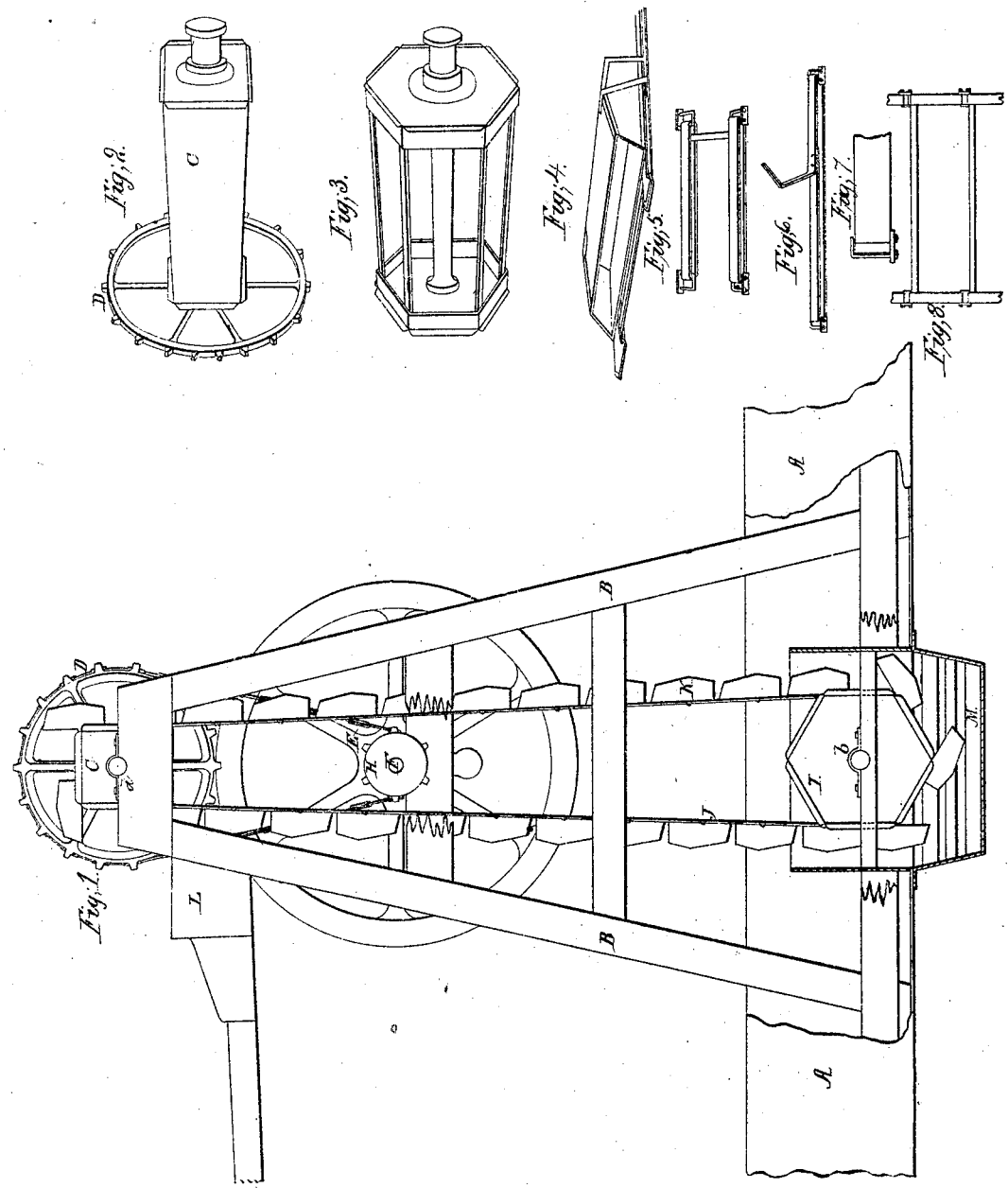

CHARLES FRIEDRICH FISHER, OF NEW ORLEANS, LOUISIANA, ASSIGNOR TO HIMSELF, LEWIS MOSES, BERNARD MOSES, GUSTAVE MOSES, AND WILLIAM BOGEL, OF SAME PLACE.

IMPROVEMENT IN FLOATING WATER-ELEVATING WHEELS.

Specification forming part of Letters Patent No. 112,025, dated February 21, 1871.

I, CHARLES FRIEDRICH FISHER, of New Orleans, Louisiana, have invented a certain Improvement in Floating Machines for Raising Water, of which the following is a specification, reference being had to the drawing which accompanies and forms a portion of the same.

My invention provides a cheap method for furnishing cities, towns, villages, plantations, &c., with water in any desired quantity, and at a very cheap rate, by raising the same from the river, creek, water-course, &c., at or near the point of delivery; and the machine which I have designed may be operated by steam, animal-power, wind, or by the current of the stream upon which it floats.

My machine consists of a series of buckets hinged upon endless chains, by the revolutions of which over suitable pulleys they are filled with water, carried up to any height which may be desired, and there projected beyond the periphery of the upper pulley, when they are emptied into a suitable conduit. These chains, buckets, and pulleys are operated by suitable gearing attached to the frame-work which supports them.

The frame-work, with the parts already referred to, is placed upon a large floating boat or vessel, which also carries the motor or water-wheel, so that the whole apparatus may be moved about from place to place at pleasure, said vessel being further supplied with a guard or open frame-work to protect the buckets which pass through its bottom into the water.

I am well aware that machines of a somewhat similar character have been used, time out of mind, by various nations and communities for the purpose of raising water; but these machines are for the most part of an extremely rude construction, not fully serving the purpose for which they were designed, and all of them differ materially from the machine which I have invented.

Of the accompanying drawing, Figure 1, Sheet 1, is a side elevation, the machine being erected in a boat, the side of which is partially removed to show the lower extremity of the apparatus. Figs. 2, 3, 4, 5, 6, 7, and 8, Sheet 2, are detached views, in profile and otherwise, of portions of the mechanism.

Within a boat, A, is erected a frame-work of sufficient height to secure the discharge of the water at a point whence it will flow to the desired place of distribution. At the top of this frame rotates, in journals $a$, a square chain carrier or pulley, C. (See also Fig. 2, Sheet 2.) Geared upon one end of this pulley is a spur-wheel, D, Figs. 1 and 2, operated by chain E, working on spur-wheel H of shaft F, which revolves in its own journals some feet below the top of the frame. Hence the rotation of shaft F by any motor drives the spur-wheel D and pulley C.

At the lower end of the frame, which straddles an opening or well in the bottom of the boat, is secured in journals $b$ a hexagonal idler-pulley, I. (See Fig. 3, Sheet 2.) This pulley is considerably larger than the one above, C; but the planes on its periphery coincide exactly in measurements with those of pulley C, thus adjusting the planes of both to the links of two or more endless chains, J, with the buckets K, which they carry for the purpose of raising the water, as shown in Fig. 1.

The form of bucket which I prefer as being best adapted for my purpose is shown at Fig. 4, and the links of the chain at Figs. 5, 6, 7, and 8. The chain consists of long shackles, linked together by short rings or links, and at the points of junction the buckets are attached at a point nearly two-thirds of the length of the bucket (in its vertical measurement) from the opening where the water is discharged.

The long links or shackles composing the chain are exactly coincident in measurement with the planes on the periphery of both the pulleys—hence their angles; or the points on their periphery where the planes meet catch in the short links of the chain at the point where the buckets are attached.

Having now described the various details of my machine, I will proceed to describe its *modus operandi*. The motor being attached, the empty buckets are carried down from pulley C, over idler-pulley I, where they pass into the well or opening in the bottom of the boat and come up on the other side, full of water. They are then carried up and over the pulley C and their contents discharged into the trough or conduit L.

It will be seen that, from the relative lengths and measurements of the planes of the pulleys, the buckets, and the links of the chain, each bucket, as it rises with the pulley, is projected more than half its length beyond the periphery of said pulley, and the water falls clear of it and more directly into the receiver L, none of it being lost in its passage from the well beneath. This is not the case in any method yet adopted, for in a round wheel, a hexagonal one, or one merely composed of arms or spokes, much of the contents of each bucket is either lost *in transitu* or discharged at right angles to the periphery of the upper pulley and within its diameter—a very serious objection in many cases.

I further add an open frame-work, (see *m*, Fig. 1,) which extends below the boat, around the well or opening, to protect those portions of the apparatus extending below the water.

It will be readily seen that my invention is of a very simple, and yet valuable, character; indeed, there is hardly any limit to its capacity for raising water. It is, moreover, much cheaper than any other hydraulic apparatus—such as lifting-pumps and the like—and yet it can be made of any size or capacity within reasonable bounds. Furthermore, my invention requires a much less powerful motor to work it than do other hydraulic appliances for raising water, the current of the stream upon which the apparatus floats sufficing amply, in most cases, to drive the whole of the machinery.

Claims.

What I claim as new, and desire to secure by Letters Patent, is—

1. The combination and arrangement of the spur-wheel H, wheel D, and block-pulley C, operated by the chain E, working upon spur-wheel D.

2. The relative arrangement of the buckets upon the links of the chain so that they are raised by the junction of the planes of both pulleys at their point of attachment to said chain, and consequently in turning over the upper pulley, C, project beyond its periphery.

3. The well in boat A, with guard M, in combination with the apparatus, substantially as described.

4. The combination of hexagonal wheel or pulley I (at the bottom of frame B) with square pulley C at the top, carrying the chain with its attached buckets, substantially as described.

CHARLES FRIEDRICH FISHER.

Witnesses:
RUFUS R. RHODES,
EMILE H. LEVY.